(12) United States Patent
DeCorby

(10) Patent No.: US 6,438,893 B1
(45) Date of Patent: Aug. 27, 2002

(54) ANIMAL TRAP

(75) Inventor: George P. DeCorby, Saskatchewan (CA)

(73) Assignee: Bertram Holdings Ltd., Birtle (CA)

( * ) Notice: Subject to any disclaimer, the term of this patent is extended or adjusted under 35 U.S.C. 154(b) by 0 days.

(21) Appl. No.: 09/696,396

(22) Filed: Oct. 25, 2000

Related U.S. Application Data

(60) Provisional application No. 60/181,876, filed on Feb. 11, 2000.

(51) Int. Cl.[7] ............................................. A01M 23/16
(52) U.S. Cl. ........................................................... 43/62
(58) Field of Search ....................................... 43/60–62

(56) References Cited

U.S. PATENT DOCUMENTS

| | | | |
|---|---|---|---|
| 691,301 A | * | 1/1902 | Tschantre |
| 874,654 A | * | 12/1907 | Beaudry |
| 1,648,160 A | * | 11/1927 | Boedecker |
| 1,662,476 A | * | 3/1928 | Sadosky |
| 1,668,937 A | * | 5/1928 | Brown |
| 1,669,974 A | * | 5/1928 | Cummins |
| 1,798,541 A | * | 3/1931 | Kleffman |

* cited by examiner

Primary Examiner—Charles T. Jordan
Assistant Examiner—Kimberly S. Smith
(74) Attorney, Agent, or Firm—Henderson & Sturm LLP

(57) ABSTRACT

An animal trap comprises a base and a cage having an open bottom generally cooperating with and resting on the base when in a closed position to form an enclosure. A lower front edge of the cage is pivotally attached to the front edge of the base such that a rear end of the cage may be raised with respect to the base to an open position. A latch is operable to maintain the cage in the open position or the closed position, and a trigger is located in proximity to the center of the front end of the enclosure and is operable to release the latch and allow the cage to fall from the open position to the closed position when the trigger is moved in a forward or rear ward direction, or alternately in any direction.

12 Claims, 5 Drawing Sheets

US 6,438,893 B1

ANIMAL TRAP

CROSS-REFERENCE TO RELATED APPLICATIONS

This application claims the priority of United States Provisional Patent Application No. 60/181,876 filed Feb. 11, 2000.

This invention is in the field of animal traps and in particular such traps which are safe for animals and people.

BACKGROUND

Animals can be a nuisance to and bother to people and their property. Beavers for instance cause major damage to trees, as well as interfering with natural drainage, causing flooding and so forth. It has become common to trap nuisance animals for removal from populated or other sensitive areas.

In the past leg hold traps were used for trapping fur, such as beaver, muskrat, otter, lynx and so forth. These traps are cruel to animals and are no longer in general use. These traps are also very dangerous where people and pets can accidentally spring the trap.

More recently animal traps have been developed which capture the animal with little or no injury, however these traps commonly incorporate a powerful bias element such as a spring or the like to "spring" the trap and capture the animal. These powerfully biased traps are dangerous to use in populated areas. As well they can injure the animal that springs the trap, or a second animal partially caught when a first springs the trap. Further such traps commonly restrain the animal's movement, causing stress to it.

Present box traps are open at one end, with sides that are fixed in place. The entry is thus restricted to the entrance end. Animals can also be reluctant to enter such an enclosed space.

Trap triggers may be operated by placing them in the likely path of an animal such that the animal trips the trap when passing. For example, traps are commonly set for beaver in breaches formed in the top of a dam such that water flows out. The beaver approaches the breach in order to repair it, and is trapped. For similar reasons traps are also set at the intake to culverts where water runs under a road or the like.

Also it is common to bait the trigger such that when the animal pulls on the bait, the trap is tripped. The trigger for paths or bait is commonly a different mechanism in conventional traps.

SUMMARY OF THE INVENTION

It is the object of the present invention to provide a gravity operated animal trap that is safe to use in populated areas.

It is a further object of the invention to provide such a trap that is at least partially open on the sides to reduce the reluctance of the animal to enter the trap.

It is a further object of the invention to provide such a trap that causes reduced stress to an animal caught in the trap.

It is a further object of the invention to provide such a trap where the trigger operates when pushed or pulled, or alternatively operates when moved in any direction.

The invention provides, in one aspect, an animal trap comprising a base including front, rear, left, and right edges and a cage having an open bottom generally cooperating with and resting on the base when in a closed position to form an enclosure. A lower front edge of the cage is pivotally attached to the front edge of the base such that a rear end of the cage may be raised with respect to the base to an open position. A latch is operable to maintain the cage in the open position or the closed position, and a trigger is located in proximity to the center of the front end of the enclosure and is operable to release the latch and allow the cage to fall from the open position to the closed position when the trigger is moved in a forward or rear ward direction.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
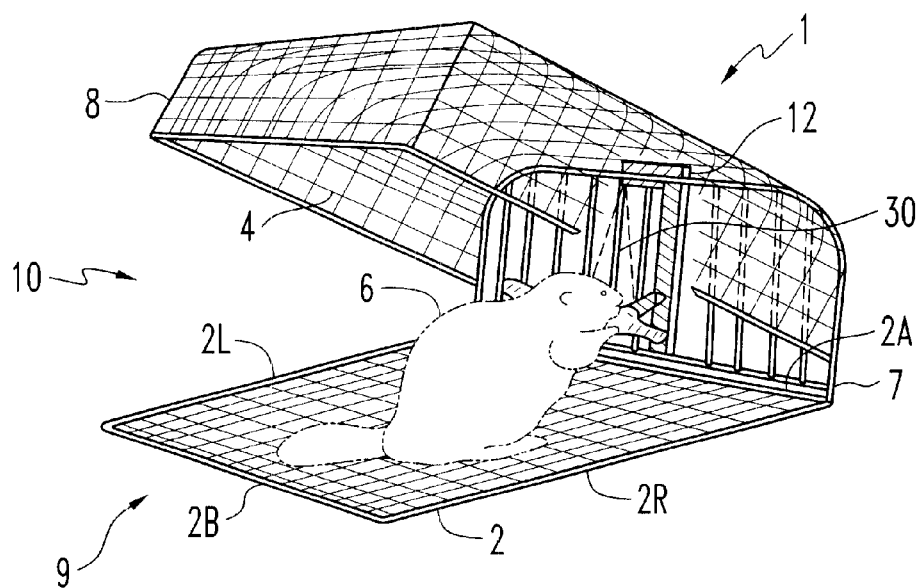
FIG. 1 is a perspective view of an embodiment of the invention in the open position.
Figure 2:
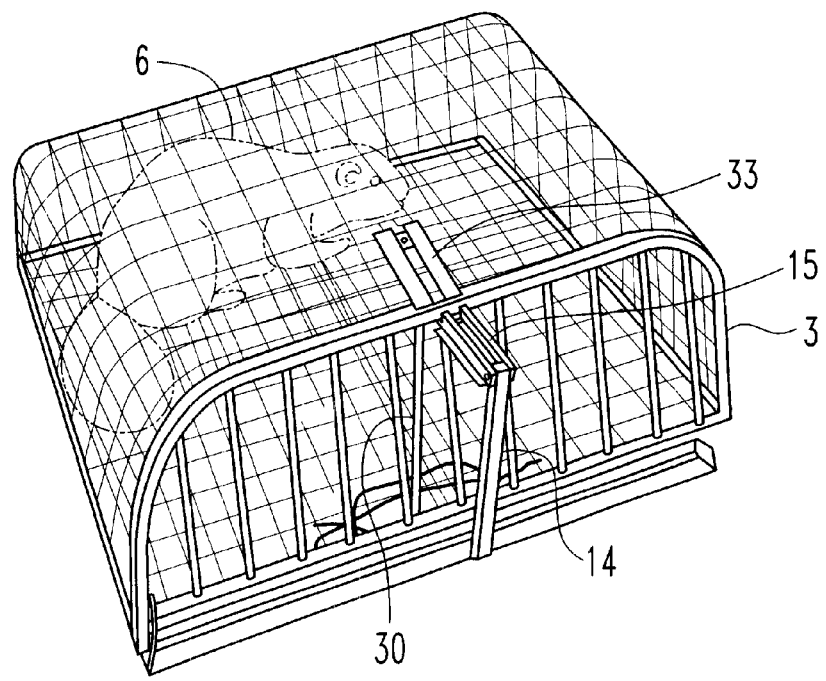
FIG. 2 is a perspective view of the embodiment of FIG. 1 in the closed position.

FIGS. 1–4 illustrate an animal trap 1 comprising a base 2 including front, rear, left, and right edges 2A, 2B, 2L, and 2R. A cage 3 has an open bottom 4 generally cooperating with and resting on the base 2 when in a closed position to form an enclosure 5. The enclosure 5 is substantially larger than the animal to be caught, as illustrated a beaver 6. The animal is able to move freely in the enclosure and suffers reduced stress as a result.

Figure 4:
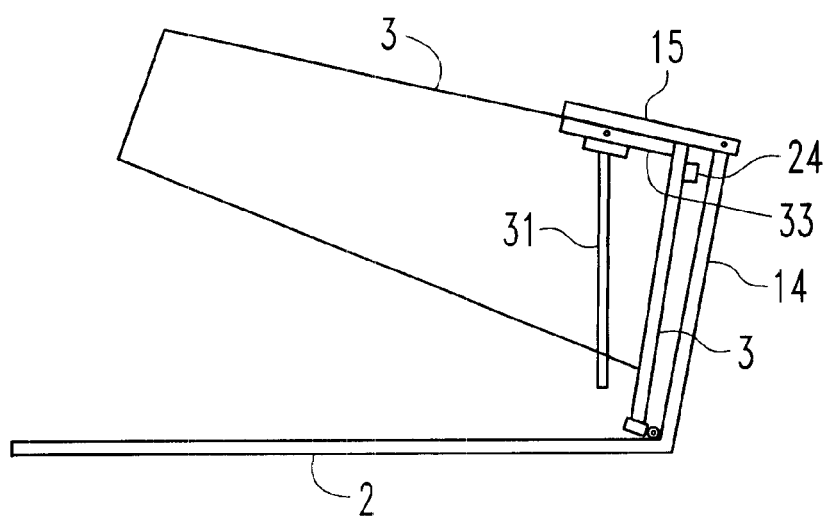
FIG. 4 is a schematic side view showing the trap of FIG. 1 in the open position with the mesh of the cage removed for clarity.
Figure 5:
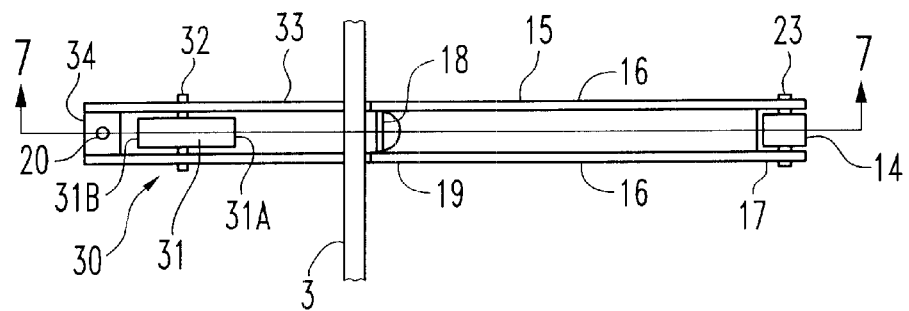
FIG. 5 is a top view of the latch and trigger when the trap is in the closed position.
Figure 6:
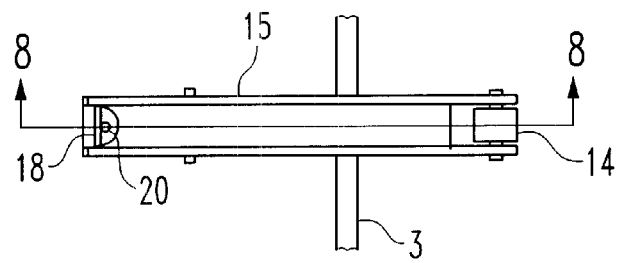
FIG. 6 is a top view of the latch and trigger when the trap is in the open position.

A lower front edge 7 of the cage 3 is pivotally attached to the front edge 2A of the base 2 such that a rear end 8 of the cage 3 may be raised with respect to the base 2 to an open position as illustrated in FIGS. 1 and 4. In the open position it can be seen that the rear 9 and sides 10 of the trap 1 are open. An animal approaching the trap 1 will thus not sense an enclosed area and is more likely to enter the trap 1.

Figure 3:
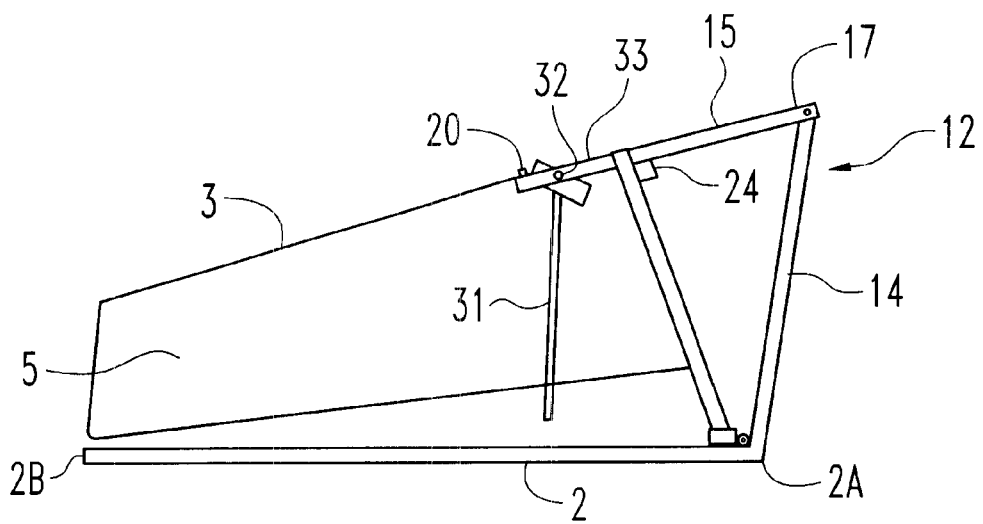
FIG. 3 is a schematic side view showing the trap of FIG. 1 in the closed position with the mesh of the cage removed for clarity.

A latch 12 is operable to maintain the cage 3 in the open position, illustrated in FIG. 4, or the closed position illustrated in FIG. 3. The latch 12 comprises an upright member 14 extending upwards from substantially the center of the front edge 2A of the base 2, and a latch arm 15 pivotally attached to a top end of the upright member 14 so as to be movable up and down. The latch arm 15 extends rearward to engage an upward oriented latch pin 20 attached to the cage 3 thereby maintaining the cage 3 in the open position.

Figure 7:
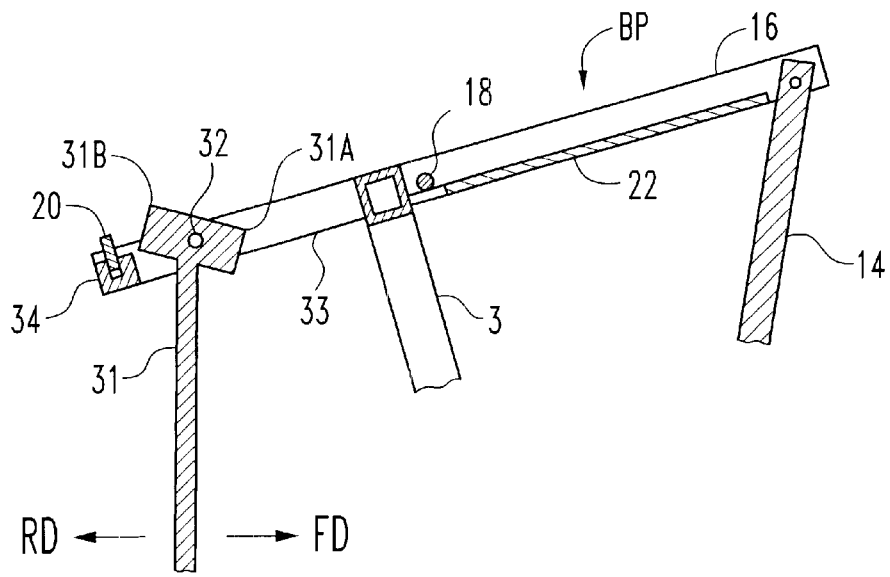
FIG. 7 is a side view of the latch and trigger when the trap is in the closed position.

The latch arm 15 comprises left and right arm members 16 attached at a pivot end 17 of the latch arm 15 to opposite sides of the upright member 14 by bolt 23. A substantially horizontal rod 18 is attached at a cage end 19 of the latch arm 15 to engage the pin 20. The bottom surface 22 of the latch arm 15 is open at the cage end 19 to allow the rod 18 to engage the latch pin 20, and extends between the left and right arm members 16 at pivot ends 17 thereof adjacent to the upright member 14 to prevent the latch arm 15 from moving downward beyond a blocking position BP wherein the latch arm 15 blocks the cage 3 from moving out of the closed position. The blocking position BP is illustrated in FIG. 7. Alternatively, a stop 24 could be attached to the cage 3 to maintain the latch arm 15 in the blocking position BP, or other devices could be easily conceived by one skilled in the art.

A trigger 30 is located in proximity to the center of the front end of the cage 3 and is operable to release the latch 12 and allow the cage 3 to fall from the open position to the closed position when the trigger 30 is moved in a forward direction FD or rearward direction RD. The trigger 30 will be activated by an animal moving forward into the trigger 30, or by an animal pulling on bait fixed to the trigger 30.

The trigger 30 comprises a trigger arm 31 pivotally attached to a pivot point at horizontal shaft 32 which extends between trigger brackets 33 attached at the top of the cage 3. The configuration is such that the trigger arm 31 hangs downward in the front portion of the enclosure 5 and may move freely about the shaft 32 in a forward direction FD or rearward direction RD.

The latch pin 20 is threaded into block 34 which is fixed between the ends of the trigger brackets 33. The distance the pin 20 extends upward may thus be varied so as to vary the amount of trigger movement required and the distance the latch arm 15 must be raised to release the cage 3 and spring the trap 1.

Figure 8:
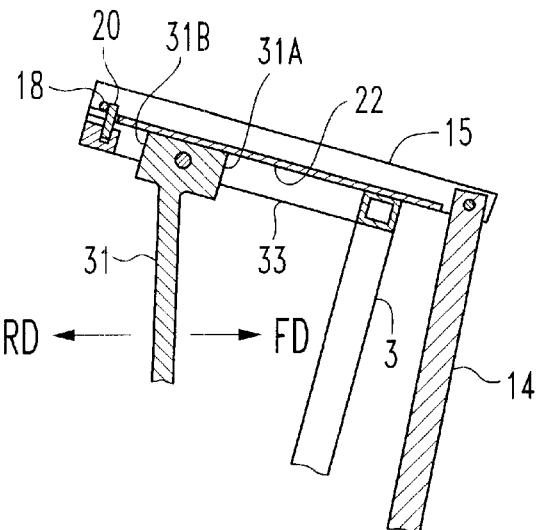
FIG. 8 is a side view of the latch and trigger when the trap is in the open position.

The trigger arm 31 includes front and rear top edges 31A, 31B. The pivot point at shaft 32 is located between the front and rear edges 31A, 31B. As illustrated in FIG. 8 the top end of the trigger arm 31 is oriented at an angle so that the front and rear edges 31A, 31B are both adjacent to the bottom surface 22 of the latch arm 15 when the cage 3 is in the open position and the trigger arm 31 is hanging vertically at rest on the shaft 32.

Moving the trigger arm 31 in the forward direction FD will cause the front edge 31A of the trigger arm 31 to move upward and raise the latch arm 15 so that the horizontal rod 18 disengages from the latch pin 20 allowing the cage 3 to fall to the closed position. Similarly moving the trigger arm 31 in the rearward direction RD will cause the rear edge 31B of the trigger arm 31 to move upward and raise the latch arm 15 so that the horizontal rod 18 disengages from the latch pin 20 allowing the cage 3 to fall to the closed position.

When the cage 3 moves to the closed position, as illustrated in FIG. 7, the latch arm 15 moves down to the blocking position BP to block the cage 3 from moving up out of the closed position.

In the illustrated embodiments the latch pin 20 and rod 18 are cylindrical, however other shapes could be suitable in certain conditions.

Figure 9:
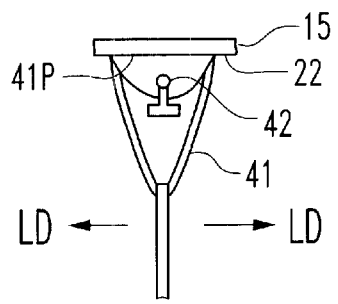
FIG. 9 is schematic front view of an embodiment of the invention where the trigger may be moved in any lateral direction to spring the trap.
Figure 10:
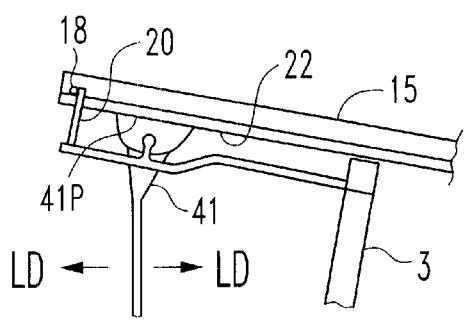
FIG. 10 is a side view of the embodiment of FIG. 9.
Figure 11:
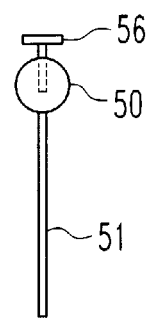
FIG. 11 is a side view of the trigger arm of an alternate apparatus where the trigger may be moved in any lateral direction to spring the trap.
Figure 12:
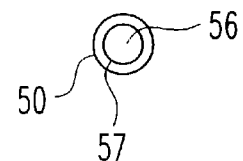
FIG. 12 is a top view of the trigger arm of FIG. 11.
Figure 13:
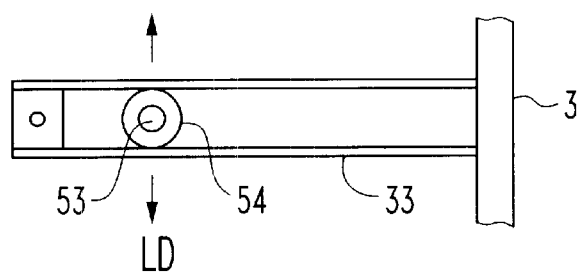
FIG. 13 is a top view of a partially assembled apparatus for mounting the trigger arm of FIG. 11.
Figure 14:
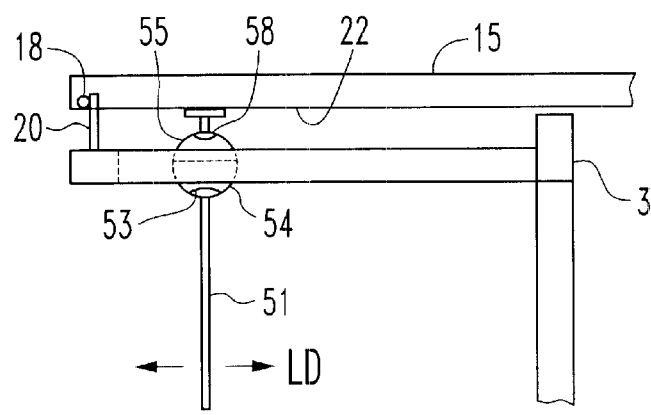
FIG. 14 is a side view of the assembled apparatus of FIG. 13 with the latch arm engaged with the latch pin.

FIGS. 9 and 10 schematically illustrate an embodiment of the invention wherein the trigger 40 is operative to release the latch 12 when pushed or pulled in any lateral direction LD. This may be an advantage in certain conditions. For example, where the trigger 30 is located far enough from sides of the cage 3, the animal trapped can approach from the open sides and be inside the cage 3 before the trigger 30 is contacted. Scaling the trap 1 for different animals and conditions will be apparent to those skilled in the art. Animals from bears to weasels could be trapped with the appropriate sized trap 1.

The trigger arm 41 is pivotally attached to a pivot point at a ball and socket connection 42 at a top of the cage 3 so as to freely hang downward in a front portion of the cage 3 and be movable in any lateral direction LD.

The trigger arm 41 includes a top end having a peripheral edge 41P and the pivot point at the ball and socket connection 42 is located at a mid-point within the periphery of the top end of the trigger arm 41. As in the prior embodiments, the top end of the trigger arm 41 is oriented at an angle so that the peripheral edge 41P is adjacent to the bottom surface 22 of the latch arm 15 when the cage 3 is in the open position and the trigger arm 41 is hanging vertically at rest on the ball and socket 42. Thus when the trigger arm moves in a lateral direction LD, part of the peripheral edge 41P will move up and raise the latch arm 15 to disengage it from the latch pin 20.

FIGS. 11–14 illustrate an alternate ball and socket trigger mount operative to release the latch 12 when pushed or pulled in any lateral direction LD. Trigger arm 51 is attached to the bottom of ball 50. The ball 50 and attached trigger arm 51 are dropped through arm aperture 53 in the bottom of bottom socket half 54 which is attached between trigger brackets 33. The top socket half 55 is secured to the trigger brackets 33 to secure the ball 50 such that the ball 50 can rotate in the socket formed by the top and bottom socket halves 55, 54.

Latch lifting plate 56 is then screwed into the top of the ball 50 through plate aperture 58. The peripheral edge 57 of the latch lifting plate 56 is adjacent to the bottom surface 22 of the latch arm 15 such that when the trigger arm 51 is moved in any lateral direction LD, the latch arm 15 is raised, releasing the rod 18 from engagement with the latch pin 20 and allowing the cage 3 to fall to the closed position.

The foregoing is considered as illustrative only of the principles of the invention. Further, since numerous changes and modifications will readily occur to those skilled in the art, it is not desired to limit the invention to the exact construction and operation shown and and accordingly, all such suitable changes or modifications in structure or operation which may be resorted to are intended to fall within the scope of the claimed invention.

I claim:

1. An animal trap comprising:
   a base including front, rear, left, and right edges;
   a cage having an open bottom generally cooperating with and resting on the base when in a closed position to form an enclosure;
   a lower front edge of the cage pivotally attached to the front edge of the base such that a rear end of the cage may be raised with respect to the base to an open position;

a latch operable to maintain the cage in the open position or the closed position wherein the latch comprises an upright member extending upwards from substantially a center of the front edge of the base, and a latch arm pivotally attached to a top end of the upright member so as to be movable up and down, the latch arm extending rearward to engage an upward oriented pin attached to the cage thereby maintaining the cage in the open position;

a trigger located in proximity to a center of a front end of the cage and operative to raise the latch arm to disengage the latch arm from the pin to allow the cage to fall from the open position to the closed position when the trigger is moved in a forward or rear ward direction;

wherein when the cage moves to the closed position, the latch arm moves down to block the cage from moving up out of the closed position.

2. The trap of claim 1 wherein the trigger comprises:

a trigger arm pivotally attached to a pivot point at a top of the cage so as to freely hang downward in a front portion of the cage and be movable forward and rearward, the trigger arm including front and rear top edges, the pivot point located between the front and rear edges;

wherein the front and rear edges are both adjacent to a bottom surface of the latch arm when the cage is in the open position with the trigger arm hanging substantially vertically such that moving the trigger forward or rearward will move one of the front or rear edges upward and raise the latch arm.

3. The trap of claim 1 wherein the pin is adjustable with respect to the cage such that a distance the latch arm is raised to disengage the latch arm from the pin can be varied.

4. The trap of claim 3 wherein the trigger comprises:

a trigger arm pivotally attached to a pivot point at a top of the cage so as to freely hang downward in a front portion of the cage and be movable forward and rearward, the trigger arm including front and rear top edges, the pivot point located between the front and rear edges;

wherein the front and rear edges are both adjacent to a bottom surface of the latch arm when the cage is in the open position with the trigger arm hanging substantially vertically such that moving the trigger forward or rearward will move one of the front or rear edges upward and raise the latch arm.

5. The trap of claim 4 wherein the latch arm comprises:

left and right arm members attached at a pivot end of the latch arm to opposite sides of the upright member;

a substantially horizontal rod supported at a cage end of the latch arm to engage the pin; and a bottom surface that is open at the cage end to allow the rod to engage the pin, and extends between the left and right arm members at pivot ends thereof adjacent to the upright member to prevent the latch arm from moving downward beyond a blocking position wherein the latch arm blocks the cage from moving out of the closed position.

6. The trap of claim 5 wherein the pin and rod are cylindrical.

7. An animal trap comprising:

a base including front, rear, left, and right edges;

a cage having an open bottom generally cooperating with and resting on the base when in a closed position to form an enclosure;

a lower front edge of the cage pivotally attached to the front edge of the base such that a rear end of the cage may be raised with respect to the base to an open position;

a latch operable to maintain the cage in the open position or the closed position wherein the latch comprises an upright member extending upwards from substantially a center of the front edge of the base, and a latch arm pivotally attached to a top end of the upright member so as to be movable up and down, the latch arm extending rearward to engage an upward oriented pin attached to the cage thereby maintaining the cage in the open position;

a trigger located in proximity to a center of a front end of the cage and operative to raise the latch arm to disengage the latch arm from the pin to allow the cage to fall from the open position to the closed position when the trigger is moved in any direction;

wherein when the cage moves to the closed position, the latch arm moves down to block the cage from moving up out of the closed position.

8. The trap of claim 7 wherein the pin is adjustable with respect to the cage such that a distance the latch arm is raised to disengage the latch arm from the pin can be varied.

9. The trap of claim 7 wherein the trigger comprises:

a trigger arm pivotally attached to a pivot point at a top of the cage so as to freely hang downward in a front portion of the cage and be movable in any lateral direction;

the trigger arm including a top end having a peripheral edge, the pivot point located at a midpoint of the top end of the trigger arm within a periphery of thereof;

wherein the peripheral edge is adjacent to a bottom surface of the latch arm when the cage is in the open position with the trigger arm hanging substantially vertically such that moving the trigger in any lateral direction will move the peripheral edge upward and raise the latch arm.

10. The trap of claim 9 wherein the trigger arm is pivotally connected to the cage by a ball and socket connection.

11. The trap of claim 9 wherein the latch arm comprises:

left and right arm members attached at a pivot end of the latch arm to opposite sides of the upright member;

a substantially horizontal rod supported at a cage end of the latch arm to engage the pin; and a bottom surface that is open at the cage end to allow the rod to engage the pin, and extends between the left and right arm members at the pivot ends thereof adjacent to the upright member to prevent the latch arm from moving downward beyond a blocking wherein the latch arm blocks the cage from moving out of the closed position.

12. The trap of claim 11 wherein the pin and rod are cylindrical.

* * * * *